Patented Feb. 11, 1941

2,231,045

UNITED STATES PATENT OFFICE 2,231,045

LITHOGRAPHIC PRINTING

William H. Wood, Bedford, Ohio, assignor to Harris-Seybold-Potter Company, Cleveland, Ohio, a corporation of Delaware No Drawing. Application May 27, 1939,
Serial No. 276,215

10 Claims. (Cl. 41—41.5)

In lithographic printing it has long been the custom to dampen the plates with water containing gum arabic, potassium dichromate, and phosphoric acid. In such usage, potassium dichromate is prone to react with impurities present in the water and form more or less of an insoluble precipitate. Furthermore, potassium dichromate is toxic to the skin and it tends to cause more or less severe and prolonged irritation where press operators come in contact with it. In accordance with the present invention however, it now becomes possible to provide particularly effective dampening, and also obviate the drawbacks of the customary materials.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

I have found that water-soluble chromium phosphate, which is a Werner Complex not like ordinary chromium phosphate that is insoluble in water, has a very valuable action in dampening solutions used in lithographic printing with metal plates. This compound affects the lithographic plate highly desirably in its action, and at the same time it is not subject to the disadvantages involved with potassium dichromate. I may prepare this product by precipitating chromic hydroxide from chromium nitrate with ammonium hydroxide, filtering and washing the precipitate and dissolving in the cold at once by adding phosphoric acid in quantity sufficient to dissolve the precipitated hydroxide. A blue violet solution results. Then this solution is warmed gently to about 60–70° C., whereupon the color changes to pure green. This is the desirable form for use, as it is very stable in solution.

In particular, this water-soluble chromium phosphate has the unusual property of resisting precipitation by a hydroxide, and the desired strength of the chromium compound may thus be maintained irrespective of customary contaminations which may be encountered, and such compound in solution will remain stable practically indefinitely, whereas ordinary potassium dichromate solutions deteriorate from the influence of light and time. And, furthermore, the compound differs from chromium compounds previously used, in that it is non-toxic on the skin. The chromium is not present in the toxic dichromate or chromate ion form, and is non-irritating. And, this property of itself renders the compound outstandingly useful in the industry.

The water-soluble compound, in use, is advantageously made up with an evaporation-restraining agent or inert water-soluble colloid, such as a soluble gum or the like, e. g., gum arabic, tahla, tragacanth, karaya, dextrin, etc. Gum arabic is convenient and may be employed. Such agent may be used in amount of a few ounces per gallon of water solution, and with gum arabic it is particularly convenient to make up a stock solution of about 14° Baumé concentration, and one to five ounces of this stock solution may be used per gallon of water for the final solution, and similarly with the water-soluble chromium phosphate it is advantageous to make up a stock solution, as for instance a ten per cent solution thereof, and one-half to two ounces of this may be employed. Thus, the dampening solution for use may comprise one-half to two ounces of a ten per cent solution of the water-soluble chromium phosphate and one to five ounces of a 14° Bé. solution of gum arabic to each gallon of water. The ten per cent solution of the water-soluble chromium phosphate has a pH of about 2 to 3.5.

The dampening solution conditions the lithographic plates very effectively and gives a much better dampening action than the solutions which have customarily been used, as it maintains the non-printing portions of the plate in better state for receiving and retaining sufficient water to repel the printing ink.

Other modes of applying the principle of the invention may be employed, change being made as regards the details described, provided the features stated in any of the following claims, or the equivalent of such, be employed.

I therefore particularly point out and distinctly claim as my invention:

1. Conditioning a lithographic plate by applying thereto a solution containing about one-half to two ounces of a ten per cent solution of a water-soluble chromium phosphate and about one to four ounces of a 14° Bé. gum arabic solution per gallon of water.

2. Conditioning a lithographic plate by applying thereto a solution containing a water-soluble chromium phosphate and gum arabic.

3. Conditioning a lithograpic plate by applying thereto a solution containing a water-soluble chromium phosphate and a water-soluble gum.

4. Conditioning a lithographic plate by applying thereto a solution containing a water-soluble chromium phosphate and an inert water-soluble colloid.

5. Conditioning a lithographic plate by applying thereto a solution containing a water-soluble chromium phosphate.

6. A lithographic plate dampener, comprising about one-half to two ounces of a ten per cent solution of a water-soluble chromium phosphate and about one to five ounces of a 14° Bé. gum arabic solution per gallon of water.

7. A lithographic plate dampener containing a water-soluble chromium phosphate and gum arabic.

8. A lithographic plate dampener containing a water-soluble chromium phosphate and a water-soluble gum.

9. A lithographic plate dampener containing a water-soluble chromium phosphate and an inert water-soluble colloid.

10. A lithographic plate dampener containing a water-soluble chromium phosphate.

WILLIAM H. WOOD.